Figure 1:
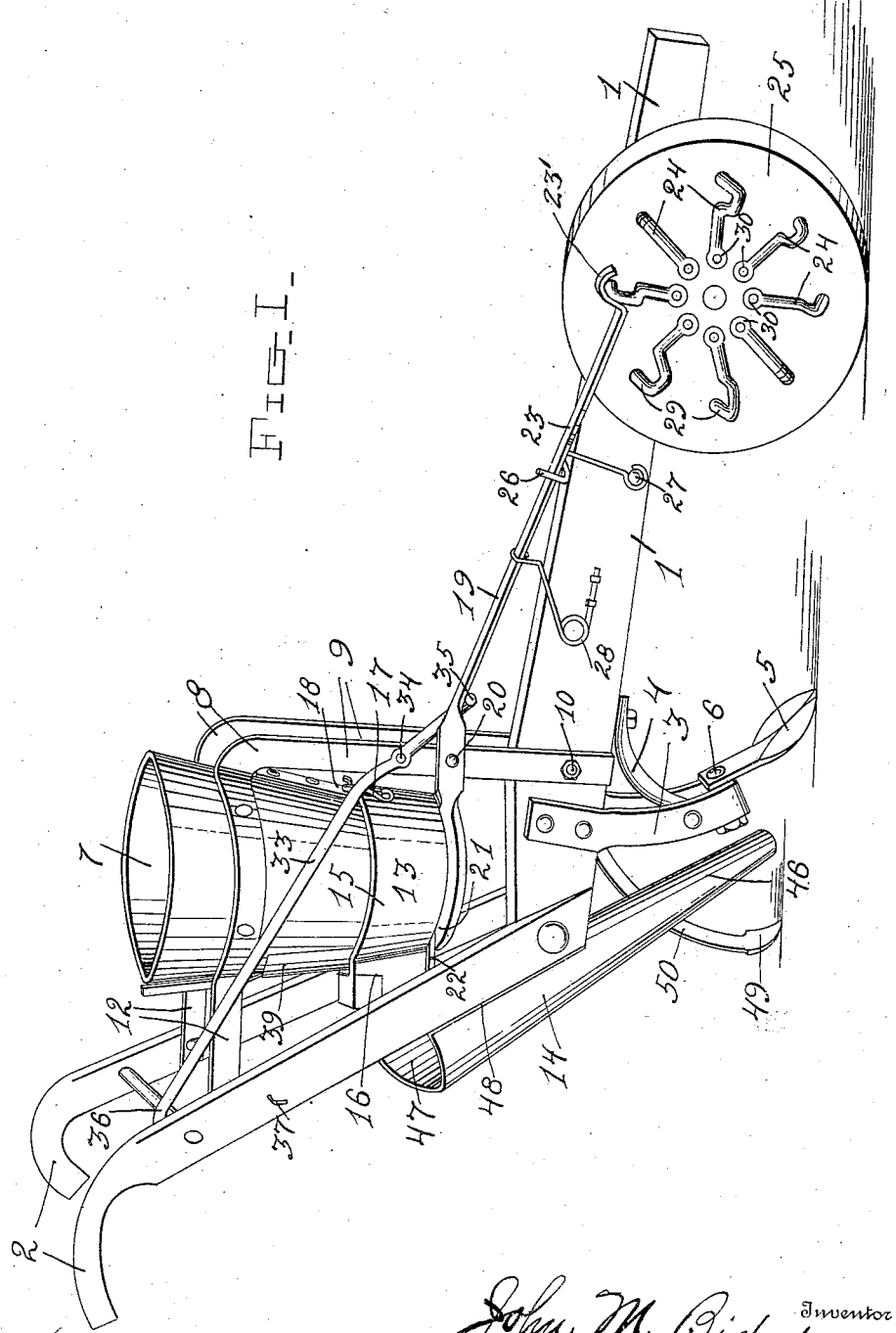

No. 872,553. PATENTED DEC. 3, 1907.
J. M. BISHOP.
FERTILIZER DISTRIBUTER.
APPLICATION FILED MAY 29, 1907.

3 SHEETS—SHEET 1.

Witnesses
J. Milton Jester
D. L. Nash

John M. Bishop, Inventor
By Watson E. Coleman
Attorney

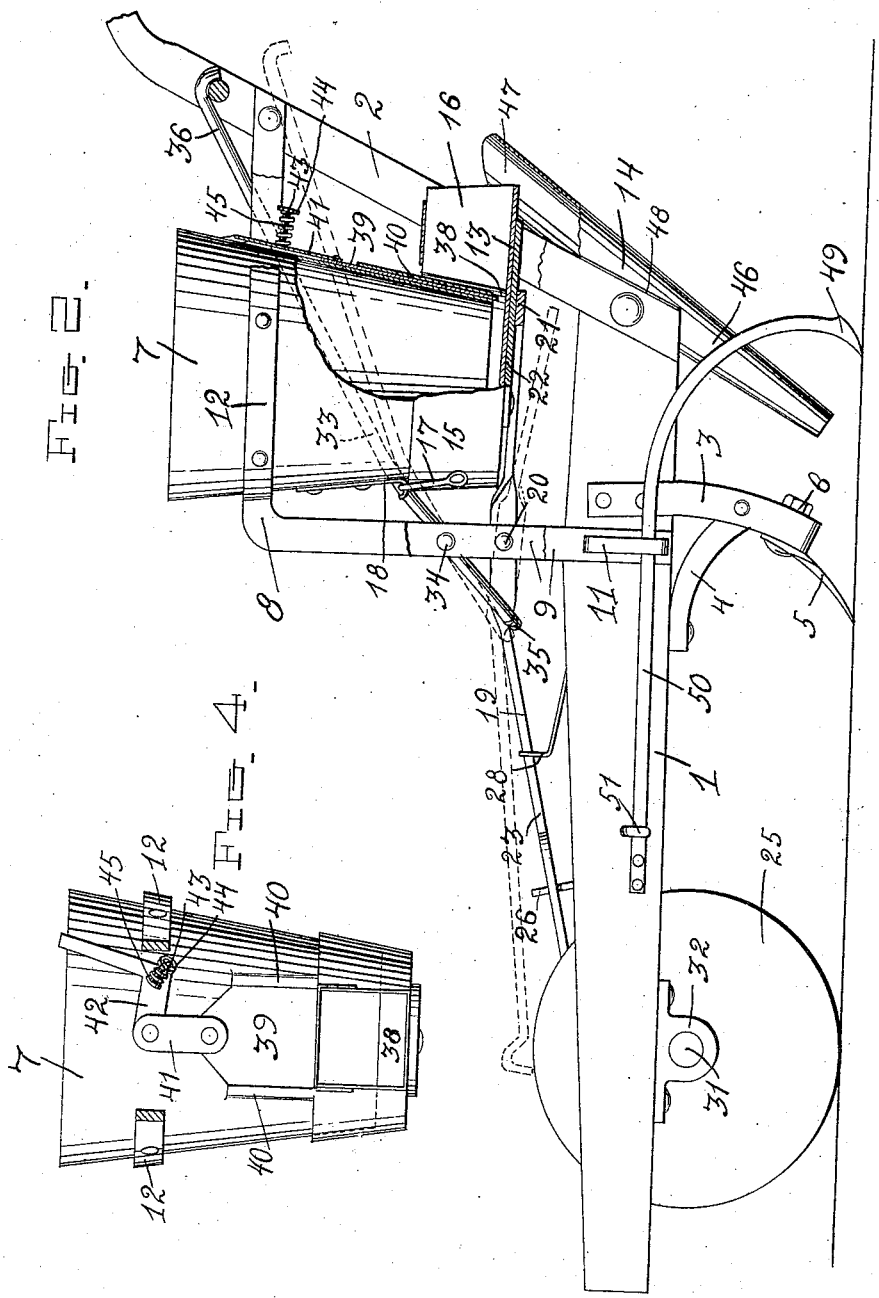

No. 872,553.  
PATENTED DEC. 3, 1907.
J. M. BISHOP.  
FERTILIZER DISTRIBUTER.  
APPLICATION FILED MAY 29, 1907.
3 SHEETS—SHEET 3.
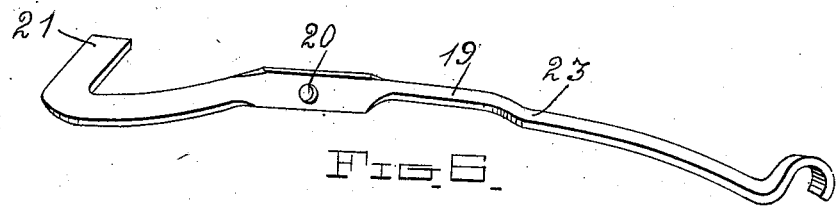
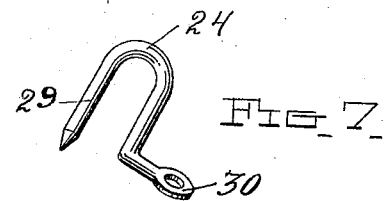
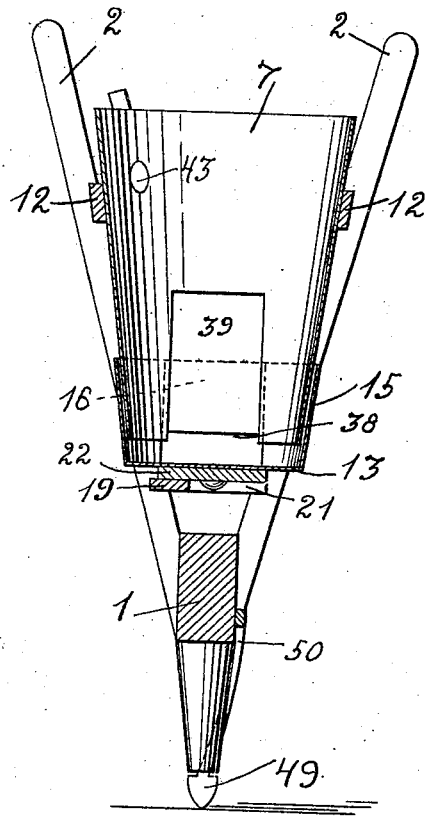
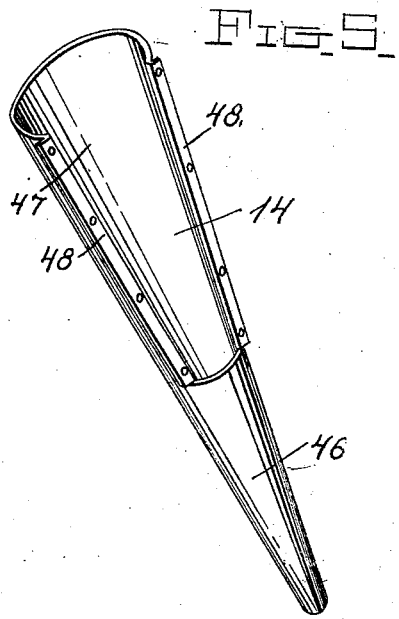
Witnesses  
J. Milton Jester  
D. L. Nash.
Inventor  
John M. Bishop  
By Watson E. Coleman  
Attorney

UNITED STATES PATENT OFFICE.

JOHN M. BISHOP, OF HUNTSVILLE, ALABAMA.

FERTILIZER-DISTRIBUTER.

No. 872,553.

Specification of Letters Patent.

Patented Dec. 3, 1907.

Application filed May 29, 1907. Serial No. 376,336.

*To all whom it may concern:*

Be it known that I, JOHN M. BISHOP, a citizen of the United States, residing at Huntsville, in the county of Madison and State of Alabama, have invented certain new and useful Improvements in Fertilizer-Distributers, of which the following is a specification, reference being had therein to the accompanying drawing.
My invention relates to improvements in machines for distributing or dropping fertilizer or the like, and it consists in the novel construction and the combination of parts hereinafter described and claimed.
One object of the invention is to provide a fertilizer distributing mechanism which may be readily attached to an ordinary plow or cultivator so that the fertilizer may be dropped in the opening or furrow made by the same.

Another object of the invention is to provide a simple and practical machine or implement of this character which may be readily regulated to drop any desired quantity of fertilizer, seed or the like and which will cause the fertilizer to be mixed or seed to be covered after it is dropped.

A further object of the invention is to improve and simplify the construction of machines of this character and thereby render the same more efficient and durable and less expensive.

The above and other objects are accomplished in the preferred embodiment of my invention, illustrated in the accompanying drawings, in which Figure 1 is a perspective view of my improved fertilizer distributer; Fig. 2 is an elevation of one side of the same, parts being broken away and in section to more clearly illustrate the construction; Fig. 3 is a vertical transverse section; Fig. 4 is a detail view of the hopper, showing its regulating gate; Fig. 5 is a perspective view of the discharge shoe; Fig. 6 is a similar view of the tappet lever; and Fig. 7 is a detail view of one of the tappet fingers.

In the drawings I have shown my fertilizer dropping mechanism in the form of an attachment mounted upon a plow or cultivator comprising a beam 1 having at its rear the usual upwardly projecting handle bars 2 and a depending standard 3 formed by doubling a piece of metal upon itself and bolting or otherwise securing its spaced upper ends upon opposite sides of the beam. The standard is longitudinally curved and is strengthened by a curved brace 4, one end of which is secured to the bottom of the beam and its other end between the spaced arms or members of the standard. A plow point or cultivator shovel 5 is secured upon the lower end of the standard by a bolt 6, as shown.

The numeral 7 denotes a hopper arranged above the rear of the beam and supported in a vertical position by two substantially right angular brackets 8 arranged upon its opposite sides. Each of said brackets has the lower end of its vertical portion 9 secured upon one side of the beam 1 by a transverse bolt 10, the head 11 of which is shaped to provide a vertically extending guide for a purpose presently explained. The horizontal arm 12 of each of the supporting brackets 8 has an outwardly curved or bowed portion to which the hopper is bolted or otherwise secured and its rear end is bolted to one of the handle bars 2, as clearly shown in the drawings. It will be seen that the brackets 8 not only rigidly support the hopper but also serve as braces for the handle. The hopper body 7 is of inverted frusto conical form and its open lower end is closed by a vibratory bottom 13 which serves to agitate the material within the hopper and discharge it into a shoe 14 arranged in rear of the plow or cultivator point. The bottom 13 is flat and has a surrounding flange 15 into which the lower end of the hopper projects. The front end of the bottom is pivotally or hingedly mounted and its rear end is formed with a discharge or outlet 16. It is hinged by a U-shaped hanger 17 secured upon the front portion of its upright flange or side wall 15 and pivotally hung in a bearing bracket 18 secured to the front of the hopper. The rear portion of the bottom 13 is supported and the latter is vibrated or oscillated vertically by a tappet lever 19 which is pivoted at 20 upon the vertical portion 9 of one of the brackets 8 and has its rear end twisted and bent into right angular form to provide a lateral arm 21 which projects transversely beneath the hopper bottom and is adapted to engage a reinforcing wear plate 22 secured upon the bottom of the hopper. The front end of said tappet lever is twisted and offset, as at 23, and its extremity 23′ is bent into S-shape for successive engagement by tappet fingers 24 arranged in an annular row upon one face of a tappet wheel 25.

The end 23 of the lever is guided in its vertical swinging movement by a guide bracket 26 secured upon one side of the beam 1 by a bolt 27 and said end of the lever is also engaged by one arm of a coil spring 28, the other arm of which is secured upon the beam. This spring tends to pull the forward end of the lever downwardly and into the path of the tappet fingers 24. Each of the latter, as clearly shown in Fig. 7, is formed from a single piece of metal rod by bending or doubling the same upon itself or into substantially U-form and tapering one of its arms 29 to form a spur which is driven into a wheel 25 and bending the end of its other arm laterally to provide an attaching foot 30 which engages one face of the wheel 25 and is apertured to receive a nail, screw or other fastening. The wheel 25 is preferably, but not necessarily constructed of wood and is provided with a journal 31 which projects from one of its side faces and is mounted for rotation in a bearing 32 secured upon the bottom of the forward portion of the plow beam 1.

For the purpose of throwing the tappet mechanism out of operation I provide a lever 33 which is pivoted at 34 upon the vertical portion of one of the brackets 8 and has its forward or lower end bent at right angles to form an outwardly projecting arm 35 to engage the bottom of the end of portion 23 of the tappet lever and raise said end out of the path of the tappets on the wheel 25. The upper and rear end 36 of the controlling lever 33 is longitudinally curved and laterally offset and is formed with a hand piece arranged adjacent to one of the handles. When said controlling lever is in an inoperative position, that is when its lower end 35 is lowered to permit of the free movement of the tappet lever, said handle end 36 rests upon the cross bar connecting the handle bars 2 and when the handle end 36 of said lever is swung downwardly and engaged with a keeper hook 37 on one of the handles 2 the end or arm 35 will elevate the forward end of the tappet lever, as indicated in dotted lines in Fig. 2.

For the purpose of controlling or regulating the discharge of the fertilizer from the hopper 7 I provide in its rear side at its bottom a vertical outlet or discharge opening 38 adapted to be controlled by a sliding gate 39. The latter is in the form of a plate arranged upon the outer side of the hopper and adapted to have vertical sliding movement in guides 40. Its offset upper end is connected by links 41 to one arm of a bell crank 42, the other arm of which forms an upwardly projecting handle. This bell crank is pivoted at its angle upon a screw stud or bolt 43 projecting from the hopper and having upon its end an adjusting nut 44. The coil spring 45 is arranged between said nut and the bell crank and serves to press said bell crank against the outer side of the hopper so as to frictionally retain it in an adjusted position in order that the sliding discharge or regulating gate 39 may be adjusted and secured to permit of the desired amount of fertilizer to be dropped from the hopper. The discharge spout or end 16 of the vibratory bottom 13 drops the fertilizer into the conducting tube or shoe 14 which is arranged upon and secured to the rear end of the beam 1 and the handle bars 2. This shoe has a tubular lower end 46 projecting downwardly and forwardly and arranged immediately in rear of the plow standard 3 and a substantially U-shaped upper portion 47 arranged between the handle bars 2 and having at its longitudinal edges flanges 48 secured to the rear edges of said handle bars. It will be seen that this arrangement of the shoe will cause the fertilizer to be dropped in the furrow made by the plow point or shovel 5, and in order to cover the fertilizer thus dropped, I provide a mixing foot or shovel 49 preferably formed integral with one end of a longitudinally curved resilient bar 50 which is arranged upon one side of the beam 1 and has its forward end secured by the hook shaped head 51 of the bolt 27 or in any other suitable manner. This resilient bar 50 projects through and is adapted to swing in the vertical guide loop 11 formed by the head of the bolt 10, as clearly shown in Fig. 2.

The construction, operation and advantages of the invention will be readily understood from the foregoing description taken in connection with the drawings. It will be seen that when the machine is drawn forwardly by a draft animal or animals hitched to the front end of the beam 1 the tappet wheel 25 will be rotated and its fingers 24 will oscillate the tappet lever which latter will in turn oscillate or vibrate the discharge bottom 13 of the hopper. This movement of the bottom causes the contents of the hopper to work beneath the controlling gate 39 and out of the discharge end 16 from which it drops into the shoe 14 and then upon the ground in the furrow made by the plow. The amount of fertilizer dropped may be readily regulated by adjusting the bell crank 42 and by operating the controlling lever 33 the tappet device may be quickly thrown out of operation.

Having thus described my invention what I claim and desire to secure by Letters Patent is:—

1. A fertilizer distributer comprising a beam, handles thereon, a standard depending from said beam, a discharge shoe arranged at the rear of the standard, angular brackets connecting said beam and handles, a hopper supported in said brackets above the rear portion of the beam, a vibratory bottom for the hopper pivoted at its forward end to the same and having at its rear end an outlet to discharge fertilizer into the shoe, a tappet wheel journaled upon the forward portion of the beam, a tappet lever pivoted upon one of said brackets and having one end shaped to engage the bottom of the hopper and its other end shaped to engage the tappets on said wheel, and a controlling lever pivoted intermediate its ends upon one of said brackets and having one of its ends projecting rearwardly to provide a handle and its other end bent angularly and engaged with the forward end of the tappet lever to elevate the same to an inoperative position, substantially as described.

2. A fertilizer distributer comprising a beam, a hopper arranged at the rear portion of the same, a vibratory bottom for said hopper, a tappet wheel upon the forward portion of the beam and provided with laterally projecting tappets, a tappet lever pivoted intermediate its ends and having its rear end bent inwardly to engage the under face of said hopper bottom and its forward end shaped to engage said tappets, a spring for actuating the tappet lever to hold its forward end in engagement with the tappets and a controlling lever pivoted intermediate its ends and having one of its ends projecting rearwardly to provide a handle and its other end projecting forwardly and bent angularly to take under the front end of the tappet lever to raise the same to an inoperative position, substantially as described.

3. A fertilizer distributer comprising a beam, handles thereon, a standard upon said beam, a shoe having a discharge arranged in rear of said standard, angular brackets having their lower ends secured to the beam and their upper or rear ends secured to the handles, a hopper secured to and supported between said brackets, a vibratory discharge bottom for said hopper, a tappet wheel, a tappet lever pivoted intermediate its ends upon one of said brackets and having at its rear end a laterally projecting arm to engage and support said discharge bottom and its forward end shaped to engage the tappets on said wheel, a spring for actuating said tappet lever, a controlling lever for moving said tappet lever to an inoperative position, a controlling gate for regulating the discharge of the contents of the hopper, and a resilient bar or rod carried by the beam and having a mixing point or shovel to travel in rear of the discharge end of said shoe, substantially as described.

4. In a fertilizer distributer, a beam, a standard carrying a plow point or shovel, a fertilizer discharge shoe arranged in rear of said beam, a vertically extending guide arranged upon one side of said beam, and a resilient rod or bar arranged horizontally upon one side of the beam and extending through said guide for vertical movement therein, the front end of said rod or bar being fixed to the beam and the rear end of the same being curved downwardly and terminating in a covering and mixing shovel arranged in rear of said shoe, substantially as described.

5. In a fertilizer distributer, a beam, handles thereon, a hopper supported above the rear portion of the beam in front of said handles and formed with an open lower end and a discharge opening in its rear side, a gate on the rear side of said hopper to control said discharge opening, a hook upon the front side of the hopper, a vibratory bottom for the hopper provided with an upwardly extending flange to receive the lower end of the hopper, the rear portion of said bottom and its flange being arranged to provide a discharge spout, a loop or bail arranged upon the front portion of the flange of the bottom and engaged with the hook on the hopper to pivotally suspend said bottom, a wear plate arranged upon the under face of said bottom and a pivoted tappet lever adapted to engage said wear plate to vibrate said bottom, substantially as described.

6. In a fertilizer distributer, a hopper having an open lower end and an outlet opening formed in its side at said end, a flanged vibratory bottom to receive the lower end of the hopper, guides arranged upon the opposite side edges of the outlet opening in the hopper, a sliding gate arranged in said guides to control said opening, a screw stud projecting from the hopper, a bell crank pivoted upon the screw stud and having one arm projecting upwardly to provide a handle, a link connecting the other arm of the bell crank to the upper end of the gate, an adjusting nut upon the outer end of the screw stud and a coil spring arranged upon said stud between the nut and the bell crank and adapted to force the latter into frictional engagement with the hopper to retain said gate in an adjusted position, substantially as described.

7. In a fertilizer distributer the combination with a tappet lever for operating its dropping mechanism, of a tappet wheel and tappets upon said wheels each of said tappets being formed by a rod bent upon itself to provide a substantially U-shape portion having one arm straight and pointed to form a spur and its other arm bent at right angles and formed with an aperture to receive a fastening, substantially as described.

In testimony whereof I hereunto affix my signature in presence of two witnesses.

JOHN M. BISHOP.

Witnesses:
J. H. McANELLY,
JNO. RIRON JONES.